United States Patent Office 3,677,988
Patented July 18, 1972

3,677,988
TEXTURE COATING COMPOSITION OF POLYVINYL ACETATE EMULSION, ASBESTOS AND PORTLAND CEMENT
Albert L. Kimmel, Kansas City, Mo., assignor to Butler Manufacturing Company, Kansas City, Mo.
No Drawing. Filed Feb. 20, 1970, Ser. No. 13,209
Int. Cl. C08f 45/24
U.S. Cl. 260—29.6 S                    8 Claims

ABSTRACT OF THE DISCLOSURE

A new textured coating having a random stucco-like appearance formed from asbestos and portland cement dispersed in a polyvinyl acetate or ethylene modified polyvinyl acetate emulsion. The above coating composition can also contain other mineral fillers, such as perlite, sand and vermiculite.

BACKGROUND OF THE INVENTION

Field of the invention

The present invention contemplates a novel textured coating composition which is hard, tough and yet resilient and is not friable or brittle. It has superior adhesion to substantially all substrates and will not crack, craze or alligator with age.

DESCRIPTION OF THE PRIOR ART

Many compositions for textured coatings have been known. The most significant of these are the stucco type composition and the linseed oil mastic type coating. When applying the stucco coatings, it is necessary to have a patterned surface, such as metal or wood lathes or wire mesh to promote adhesion of the stucco to the surface. These stucco coatings are hard and brittle and will crack and sometimes lose adhesion from the substrate when exposed to weather or from age.

The other well-known type of textured coating is that of the linseed oil mastic type which has the disadvantage of cracking, crazing or alligatoring with age.

Due to the necessity of preparing patterned surfaces for stucco adhesion and due to the difficulty of the linseed oil mastic crazing when exposed to elements, these coatings are not versatile in their use. They cannot easily be used either indoor or outdoor and the surfaces to which they are applied are not only selective but must be modified to obtain any substantial adherence.

There is, therefore, a need for a hard, tough and yet resilient coating that will not craze or crack and which can be applied easily without pretreatment of the surfaces and which has good adhesion and durability.

SUMMARY OF THE INVENTION

It is accordingly one object of the present invention to provide a new textured coating composition containing polyvinyl acetate, portland cement and asbestos which has superior adhesion to all substrates.

Another object of the invention is to produce a textured coating which will not craze or crack and which does not need a patterned surface for adhesion.

Yet another object of the invention resides in a novel textured coating composition which may contain mineral fillers and which results in a hard, tough, and yet resilient coating that is not friable and brittle.

A further object of the invention resides in a novel textured coating composition which may be applied with a hopper gun, trowel or deeptexture roll to metal, masonry or wood structures and which can be covered with a conventional exterior latex or oil base finish of any color.

These and other advantages of the present invention will become apparent from the following description and examples.

In accordance with the above objects, a new textured coating has been found which contains basically a mixture of medium to short asbestos fibers (4T3 to 4T4 in the International Scale of Asbestos Grading) and portland cement dispersed in a polyvinyl acetate or ethylene modified polyvinyl acetate emulsion with or without other mineral fillers. This new textured coating is a hard, tough, and yet resilient coating that is not friable and brittle and has superior adhesion to all substrates. These substrates may be steel, galvanized iron, wood, Masonite, Transite, brick or stone. The coating may be applied by hopper gun, trowel or deeptexture roll and does not require a patterned surface for adhesion, such as metal or wood lathes or wire mesh. The material does not crack or craze as does other coatings of the prior art.

These coatings can be applied as a finish to prefabricated wall sections, either metal or others, as a finish on old or new wood, or on metal or Masonite structures. The texture can be painted with a conventional exterior latex or oil base finish thus providing the coating with any desired color. The coatings can be applied to both indoor and outdoor walls. A typical formulation for these coatings for good spray texture is as follows:

| | Percent |
|---|---|
| Asbestos fiber | 25–75. |
| Portland cement | 25–50. |
| Aggregate filler | 0–50. |
| Ethylene modified PVAc emulsion | 12–35. |
| Water | As needed for application. |

It is important that the latex have a viscosity of at least 1100–2000 cps. As such, it will be known in the trade as an adhesive grade, rather than paint grade, latex.

DESCRIPTION OF THE PREFERRED EMBODIMENTS

In accordance with the present invention, the new textured coatings consist basically of a mixture of medium to short fiber asbestos and portland cement dispersed in a polyvinyl acetate or ethylene modified polyvinyl acetate emulsion with or without other mineral fillers. Some of the other mineral fillers which may be included in the coating material are expanded shale or clay (1/16" size or less), perlite, sand, and vermiculite. Although the added fillers are not essential, they do contribute to the texture pattern and density of the finished coating. The following are a number of typical examples that have proved successful.

EXAMPLE I

| | Parts by weight |
|---|---|
| Asbestos | 100 |
| Portland cement | 100 |
| Ethylene modified PVAc | 120.6 |
| Water | 390.0 |

EXAMPLE II

| | Parts by weight |
|---|---|
| Asbestos | 75.0 |
| Portland cement | 150.0 |
| Sand | 300.0 |
| Vermiculite | 102.5 |
| PVAc | 218.0 |
| Water | 400.0 |

EXAMPLE III

| | Parts by weight |
|---|---|
| Asbestos | 100 |
| Portland cement | 200 |
| Expanded shale | 100 |

| | Parts by weight |
|---|---|
| Ethylene modified PVAc | 160 |
| Water | 375 |

EXAMPLE IV

| | Parts by weight |
|---|---|
| Asbestos | 66 |
| Sand | 66 |
| Portland cement | 66 |
| Ethylene modified PVAc | 80 |
| Water | 270 |

EXAMPLE V

| | Parts by weight |
|---|---|
| Asbestos | 50 |
| Perlite | 71 |
| Portland cement | 100 |
| PVAc | 169 |
| Water | 450 |

Tests for 2,000 hours in the dew point Weatherometer showed no visual coating deterioration or loss of adhesion to the substrate. Tests showed that these new coatings have excellent impact resistance and are not damaged by impact as are typical stucco or linseed oil mastics.

Having thus described the compositions of the invention in terms of their preferred embodiments, which are set forth in the description and the examples of the aforesaid specification, it is apparent to those skilled in the art that various changes and modifications can be made in the composition without departing from the scope of the invention. Thus, for example, it is apparent that, although only expanded shale, or clay, perlite, sand and vermiculite have been set forth in the examples, other fillers may be used. It is also possible that other compatible resinous materials can be used.

What is claimed is:

1. A texture coating composition consisting essentially of asbestos fiber in the range of 25 to 75% by weight, portland cement in the range of 25 to 50% by weight, and a polyvinyl acetate aqueous emulsion having a viscosity of at least 1,100 to 2,000 centipoises in the range of 12 to 35% by weight.

2. The composition of claim 1 wherein the asbestos fiber is of a size of from 4T3 to 4T4 according to the International Scale of Asbestos Grading.

3. The composition of claim 1 additionally containing from 0 to 50% of an aggregate filler selected from the groups consisting of expanded shale, expanded clay, perlite, vermiculite and sand.

4. A texture coating composition consisting essentially of 100 parts by weight asbestos, 100 parts by weight portland cement, 120.6 parts by weight of a polyvinyl acetate emulsion having a viscosity of at least 1,100 to 2,000 centipoises, and 390 parts by weight water.

5. A texture coating composition consisting essentially of 75 parts by weight asbestos, 150 parts by weight portland cement, 300 parts by weight sand, 102.5 parts by weight vermiculite, 218 parts by weight of a polyvinyl acetate emulsion having a viscosity of at least 1,100 to 2,000 centipoises and 400 parts by weight water.

6. A texture coating composition consisting essentially of 100 parts by weight asbestos, 200 parts by weight portland cement, 100 parts by weight expanded shale, 160 parts by weight of a polyvinyl acetate emulsion having a viscosity of at least 1,100 to 2,000 centipoises, and 375 parts by weight water.

7. A texture coating composition consisting essentially of 66 parts by weight asbestos, 66 parts by weight sand, 66 parts by weight portland cement, 80 parts by weight of a polyvinyl acetate emulsion having a viscosity of at least 1,100 to 2,000 centipoises, and 270 parts by weight water.

8. A texture coating composition consisting essentially of 50 parts by weight asbestos, 71 parts by weight perlite, 100 parts by weight portland cement, 169 parts by weight of a polyvinyl acetate emulsion having a viscosity of at least 1,100 to 2,000 centipoises, and 450 parts by weight water.

References Cited

UNITED STATES PATENTS

| 2,581,295 | 1/1952 | Redfarn | 260—29.6 S |
|---|---|---|---|
| 2,990,382 | 6/1961 | Wagner et al. | 260—29.6 S |
| 2,311,233 | 2/1943 | Jaenicke et al. | 260—29.6 S |
| 2,733,995 | 2/1956 | Robinson | 260—29.6 S |

FOREIGN PATENTS 44,097  12/1965  Germany.

HAROLD D. ANDERSON, Primary Examiner

U.S. Cl. X.R.

117— 132 C, 148; 260—29, 6 RB